UNITED STATES PATENT OFFICE.

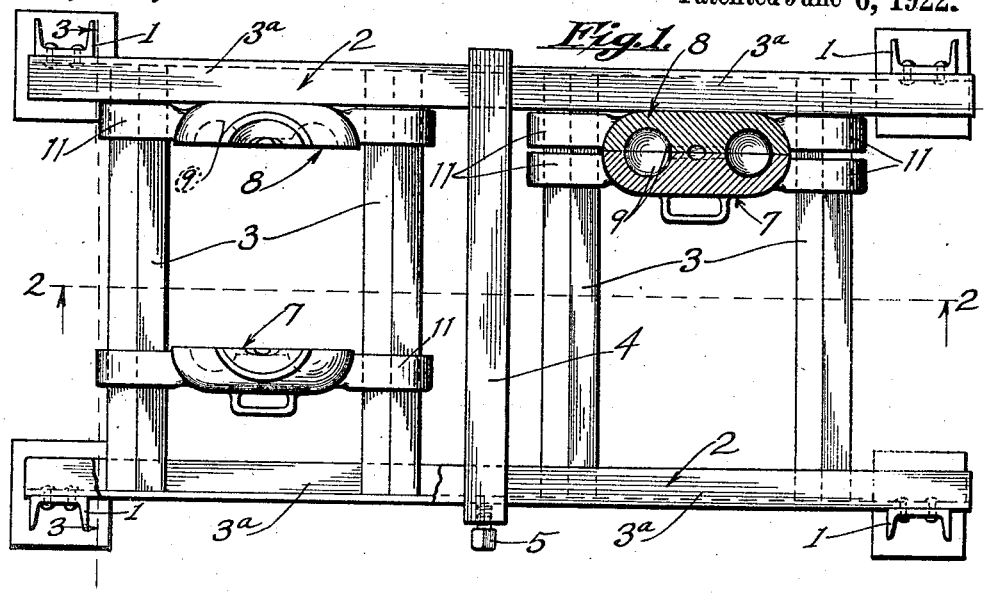

WILLIAM WALSH, DAVID H. MILLER, AND ABNER MILLER, OF LOS ANGELES, CALIFORNIA.

MOLD SUPPORT.

1,419,086.  Specification of Letters Patent.  Patented June 6, 1922.

Application filed March 15, 1921. Serial No. 452,502.

*To all whom it may concern:*

Be it known that we, WILLIAM WALSH, DAVID H. MILLER, and ABNER MILLER, citizens of the United States, residing at Los Angeles, in the county of Los Angeles and State of California, have invented new and useful Improvements in Mold Supports, of which the following is a specification.

This invention relates to casting devices of the type including a frame and co-operating mold members carried thereby and readily slidable toward and away from one another in order to form a mold.

It is the object of the present invention to provide a device of this character comprising an extremely simplified frame structure and having mold members readily slidable thereon and removable from the same.

The invention will be readily understood from the following description of the accompanying drawings, in which—

Figure 1 is a plan view of a casting device constructed in accordance with the invention, and partly in horizontal section.

Fig. 2 is a longitudinal section on the line 2—2 of Fig. 1.

Fig. 3 is a transverse section on the line 3—3 of Fig. 1.

Fig. 4 is a front elevation of one of the mold members employed in the device and showing a modified form of the same.

The frame of the device comprises corner uprights shown as channel irons 1 which support longitudinally extending and transversely spaced channel irons 2 arranged with their channels 3ª turned toward one another. Runners 3 span the space between the channel irons and are arranged in pairs adapted to slidably support the mold members between the respective runners of a pair. The runners are shown as angle irons having the ends of the respective angles thereof resting upon the lower webs of channel bars 2 and thereby forming runners. In order to retain the runners between channel bars 2, a clamp 4 spans the space between the channel bars with its ends received over the respective bars. A set screw 5 may be employed for screwing a clamping member in position.

The mold members are shown as co-operating members 7 and 8 having molding recesses 9 in their adjacent surfaces, which in the present instance are shown as recesses adapted to mold spherical members. In the modification of the invention illustrated in Fig. 4, the molding recesses 9ª are shown as arranged to mold cylindrical members.

The co-operating molding members are slidably and removably supported by a pair of runners 3. For this purpose the mold members are provided with laterally projecting lugs 11 having recesses 12 in their lower edges conforming to runners 3. By this arrangement the mold members may be readily supported by the runners and are free for sliding movement along the same. The recesses 12 conform to the shape of the runners preventing displacement of the mold members.

Various changes may be made without departing from the spirit of the invention as claimed.

What is claimed is:

In a mold support, a base, channel iron corner uprights rigidly mounted in the base, channel iron side bars, one bar connecting the two rear uprights and the other bar connecting the two front uprights, said side bars being secured to the uprights with their channels towards each other and pairs of angle iron rings mounted transversely with their ends in the channels of the side bars, said rings resting upon their edges with their centers projecting upwardly, a clamp comprising a bar resting upon the side bars and having ends extending downwardly outside of the side bars, and a set screw through one end so that the rings may be positioned in the channels of the side bars and the set screw tightened to spring the side bars to grip the rings.

In testimony whereof we have signed our names to this specification.

WM. WALSH.
DAVID H. MILLER.
ABNER MILLER.